Patented Oct. 25, 1949

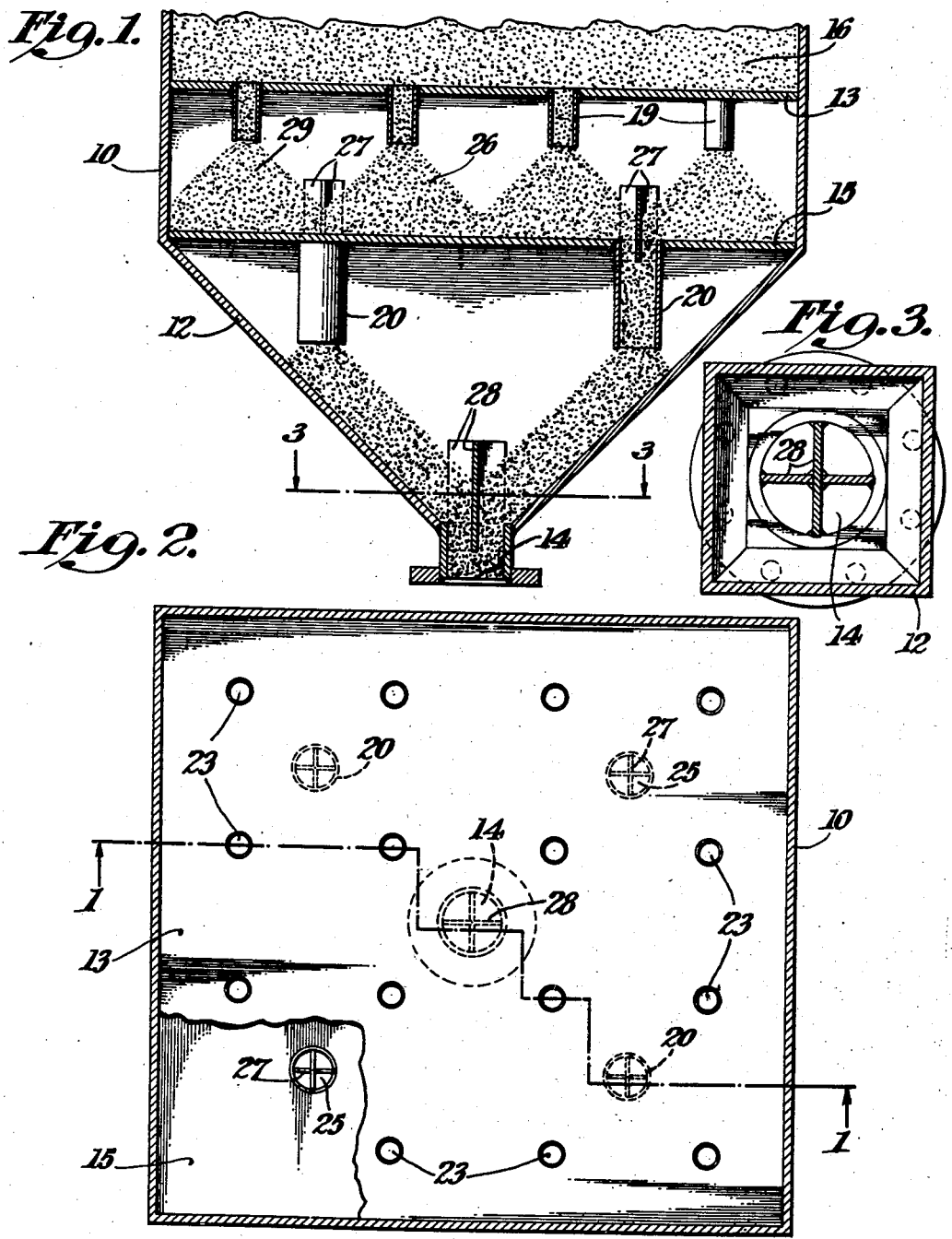

2,486,200

UNITED STATES PATENT OFFICE 2,486,200

CLAY FLOW BAFFLE

Ward J. F. O'Connor, Bayonne, N. J., assignor to The Lummus Company, New York, N. Y., a corporation of Delaware Application December 17, 1946, Serial No. 716,789

8 Claims. (Cl. 259—180)

This invention relates to an improved method and apparatus for controlling the flow of a granular material and more particularly to the uniform gravity flow of a granular material through a chamber such as a catalytic reactor used in continuous catalytic contact processes.

Exemplary of such processes are the catalytic reforming of naphtha and gasoline, catalytic hydrogenation, dehydrogenation, isoforming, alkylation, desulphurization, aromatization, and cracking of hydrocarbon fractions. Typical of such processes is the catalytic cracking conversion of hydrocarbons, it being well known, for example, that gas oils boiling within the range of about 450° F. to 750° F. upon being contacted with certain adsorbent materials at temperatures of the order of 800° F. and higher and usually at super-atmospheric pressures may be converted to lower boiling hydrocarbons containing large amounts of gasoline. The catalytic materials involved in such processes may take the form of natural or treated clays, bauxites, alumina and certain synthetic associations of silica, alumina, or silica and alumina to which small percentages of other materials may be added such as certain metallic oxides. The catalysts may vary in particle size depending upon the type of process involved. For processes wherein the catalyst moves through the conversion zone as a substantially compact column of particles, the catalyst particles may range in normal size from about 4 to 60 mesh and preferably from about 4 to 8 mesh by Standard Tyler Screen Analysis.

This invention is particularly concerned with an improvement in that type of catalytic conversion process wherein a particle form catalyst is passed cyclically through a conversion zone wherein it moves as a substantially compact column and is contacted at elevated temperature with gaseous hydrocarbons to effect the conversion thereof and through a regeneration zone wherein it moves as a substantially compact column and is contacted with a combustion supporting gas acting to burn off the catalyst carbonaceous contaminants deposited thereon during the hydrocarbon conversion.

In many of these operations, the chemical reaction that takes place is a function of the contact surface area and the temperature of the contact particles and of the temperature of the reacting materials. It has become apparent that average conditions are always below optimum conditions and the greater the irregularity of flow, the greater the deviation in results.

It is therefore the principal object of my invention to assure the uniform flow of contact material in the gravity movement of large beds which may be from 8 to 18 feet in diameter.

More specifically, I provide an improved form of flow control baffles so arranged as to prevent choking of many of the openings and to assure the continuous downward movement of all parts of the contact bed.

A further object of my invention will appear from the following description taken in connection with the attached drawings which are illustrative of a preferred form of embodiment of the invention and in which:

Fig. 1 is central vertical section through an improved form of reactor taken substantially along the line 1—1 of Fig. 2. Fig. 2 is a horizontal section through the reactor shown in Fig. 1 with parts broken away to show different baffles for flow control plates.

Fig. 3 is an enlarged, horizontal section taken substantially along the line of 3—3 of Fig. 1.

In the present day operation of continuous bed catalytic conversion units for the cracking of gasoline and for other purposes, it is customary to continuously move by gravity a bed of contact material through a reaction chamber at a rate of 100 tons per hour or more. With apparatus of this type it is necessary to build the reactors from 10 to 20 feet in diameter and in order to have the desired reaction time the reactors have been as high as 150 feet from the inlet to the outlet. To such reactors it is common to feed either vapors or liquids in either a concurrent or a countercurrent manner and at such a temperature that the desired reaction will take place. Although I do not show either a complete reactor or a complete regenerator which follows the reaction step and permits the removal of carbon by oxidation, I have diagrammatically shown the lower portion of a chamber which is of this general type.

More particularly the converter 10 is provided with a conical or pyramidal base portion 12 which extends to the outlet 14. This converter 10 is preferably filled with a gravity moving contact material 16 which may be of any of the customary types.

In accordance with my invention I provide a plurality of transverse flow control baffles indicated at 13 and 15 both of which are provided with suitably spaced openings generally indicated at 23 and 25 respectively. If desired, suitable nozzles 19 and 20 will be used below the opening 23 and 25 respectively.

In this chamber the flow of granular material through the nozzles 19 will result in the formation of angles of repose in the nature of conical piles 26 of the contact material. The flow across the entire reactor can be made uniform by the provision of an adequate number of openings 23 by which the total mass is uniformly passed downwardly.

In order to pass the material from the second baffle 15 to the bottom it is desirable to utilize fewer holes and preferably one opening 25 is sufficient for four of the upper openings 23. In other words by increasing the diameter of the nozzle 20 it will have the capacity of four nozzles 19.

An important feature of my invention is the provision of the guide plate which projects into the upper end of the nozzle 20 and is provided with a cruciform shape which actually divides the opening 25 into quarters.

It is my observation that without the use of the guide plate 27 there is a tendency for the pile of contact material 26 to choke the entire opening into nozzle 20. If the flow slows down in one pile and accelerates in another there will be a continuous bridging of the slower moving pile with the result that the faster moving pile will rapidly draw off from only one section of the baffle above.

These flow characteristics were observed in a cutaway model. It was observed in this model that the difference between flowing catalyst and stopped catalyst on the side of a pyramidal pile of catalyst 26, such as exist between flow baffles, could be as little as one or two degrees and the angle of flow would increase with the increase of fines in the catalyst mass. This condition makes it necessary for streams flowing to a single hole to intersect at the center of the hole, or very nearly so, in order to maintain flow through all holes. At low catalyst flow rates the streams that do not intersect at the middle of the drawoff hole stop flowing.

By the use of the guide flow plate 27, the flow from any one pile 26 will be independent of that from any other pile 29. This condition is brought about by extending the guide plate 27 a sufficient distance above the baffle 15 and a sufficient distance down into the nozzle 20. The flow guide plate 27 must be a sufficient distance above the baffle 15 to prevent the catalyst from flowing over the top of the guide flow plates. It must extend a sufficient distance into the nozzle so that the direction of flow of the catalyst from any of the pyramidal piles of catalyst will be so changed in the guide plate from a direction at an angle to the vertical axis of the chamber to a direction substantially parallel to the vertical axis of the chamber. Thus, at any point in the lower part of the nozzle 20 the particles of catalyst will be flowing in substantially parallel, separate paths and the catalyst from the separate pyramidal piles 29 and 26 flowing to the same opening will not interfere. In this manner the bridging across of the slower moving pile will be effectively eliminated thereby providing for a uniform flow of the material across the chamber.

I find it also desirable to use a similar guide plate 28 which projects into the outlet opening 14. In this manner I can provide a single outlet opening 14 for four nozzles 20 with the result that I can have uniformity even with two stages of geometric progression.

The guide plate 28 is also of a cruciform shape. This is necessary when, as in this case, four of the downflow holes lead to a single opening on the next baffle below. It is obvious, however, that this guide baffle or guide plate may have a greater or lesser number of sections depending on the number of holes it is used to draw off from. In the example chosen there are four holes feeding into one hole on the plate below.

It should be noted that the sections into which a hole 25 is divided by the guide baffle 27, must each be of an area equal to or less than the areas of the holes 23 drawn from on the baffle 13. This is necessary in a contact chamber of the type described where a gas seal must be maintained in the baffle zone at the bottom of the chamber. By making the area of each of the openings on the lower baffle less than the total area of the four holes on the upper baffle from which the respective lower opening draws catalyst, in the example chosen, the lower holes will be substantially filled with flowing catalyst at all times even with small variation in the total catalyst flow through the contact chamber. This consideration is not important, of course, where it is not necessary to maintain a gas seal at the bottom of the chamber. Then, it is only necessary that the lower holes be of an area approximately equivalent to the total area of the holes from which they receive the flowing granular material.

While only two stages are shown, it will be apparent that it may be desirable to proceed with more than two transverse baffles and it will also be apparent that the guide plates might be provided with 2, 3 or 5 openings depending on the physical conditions involved.

It will also be noted that I have shown only a square shape reactor; it is equally possible to use a cylindrical reactor.

In a typical case for a catalyst rate of flow of 150 tons per hour, the small holes would be four inches in diameter and the opening into the nozzle 25 would be slightly less than 8 inches in diameter with an outlet opening 14 of slightly less than 16 inches diameter. The catalyst in this arrangement flows from four of the small holes to one of the lower and larger holes. The cross-sectional area of each of the larger holes is a little less than four times the areas of each of the smaller holes.

The capacity of such a unit is materially increased by the use of the flow guide baffles as herein described. In the aforementioned unit the capacity was increased from 110 tons of catalyst per hour without the flow guide baffles to a rate in excess of 150 tons per hour with the flow guide baffles with uniform flow of catalyst across the chamber.

My invention is applicable not only to catalytic reactions but to any other processes in which it is essential that there be a uniform gravity flow of granular material through a chamber. Thus, this same arrangement might be used for insuring the even flow of a granular material such as a coking catalyst in a continuous coking process, or granular substance used to transfer heat continuously between high and low temperature sources.

It is obvious, of course, that the apparatus, herein described, would be useful to control the flow in such non-reactors as grain elevators, coal or gravel hoppers and the like.

While I have shown and described a preferred form of embodiment of my invention, I am aware that modifications may be made therein and I, therefore, desire a broad interpretation of my invention except as it may be limited by the following claims.

I claim:

1. A chamber of the class described having inlet means for the introduction of a granular material which flows therethrough solely by the effect of gravity, discharge means at the lower part thereof to remove said granular material and means to control the uniform flow of granular material over the entire cross section of the chamber, said flow control means including a plurality of horizontal baffles, the uppermost of said baffles being provided with a number of spaced openings, the lower baffles having a lesser number of openings of relatively greater cross section, each spaced to receive a flow of granular material from a plurality of openings in the baffle next above, guide means in said openings in the lower baffles dividing the cross-sectional area of said openings into substantially uniform areas approximately equal to the cross-sectional areas of each of the openings in the baffle next above from which the opening in the lower baffle receives granular material whereby the velocity of flow from each of the openings in the baffle next above is maintained substantially uniform.

2. A chamber of the class described having inlet means for the introduction of a granular material, discharge means at the lower part thereof to remove said granular material, and means to control the uniform gravity flow of granular material over the entire cross section of the chamber, said flow control means including a plurality of horizontal baffles, the upper of said baffles being provided with a number of uniformly spaced openings, the lower baffle having a lesser number of uniformly spaced openings of relatively greater cross section, the lower opening drawing from a plurality of upper openings, guide means in the openings in the lower baffle dividing the cross-sectional area of said openings into substantially uniform areas approximately equal to the cross-sectional areas of each of the openings in the upper baffle from which the opening in the lower baffle receives granular material whereby the velocity of flow from each of the openings in the upper baffle is maintained substantially uniform.

3. A chamber of the class described having inlet means for the introduction of a granular material, discharge means at the lower part thereof to remove said granular material and means to control the uniform gravity flow of granular material over the entire cross section of the chamber, said flow control means including a plurality of horizontal baffles, the upper of said baffles being provided with a number of uniformly spaced openings, the lower baffle having a lesser but proportional number of uniformly spaced openings of relatively greater cross section, guide means in the openings in the lower baffles dividing the cross-sectional area of said openings into substantially uniform areas approximately equal to the cross-sectional areas of each of the openings in the upper baffle from which the opening in the lower baffle receives granular material whereby the velocity of flow from each of the openings in the upper baffle is maintained substantially uniform, the discharge means at the lower part of the chamber being provided with guide means dividing the area of a discharge opening into individual areas substantially equal to the cross-sectional areas of each of the openings in the baffle next above whereby uniform cross-sectional flow is maintained from the baffle next above into the discharge opening.

4. A chamber of the class described having inlet means for the introduction of a granular material, discharge means at the lower part thereof to remove said granular material and means to control the uniform gravity flow of granular material over the entire cross section of the chamber, said flow control means including a plurality of horizontal baffles, the upper of said baffles being provided with a number of uniformly spaced openings, the lower baffle having a lesser but proportional number of uniformly spaced openings of relatively greater cross section, guide means in the openings in the lower baffles dividing the cross-sectional area of said openings into substantially uniform areas approximately equal to the cross-sectional areas of each of the openings in the upper baffle from which the opening in the lower baffle receives granular material whereby the velocity of flow from each of the openings in the upper baffle is maintained substantially uniform, said guide means extending a sufficient distance above and below the lower baffle thereby providing independent flow paths for the granular materials flowing to each of the sections of said guide means, and the discharge means at the lower part of the chamber being provided with guide means dividing the area of a discharge opening into individual areas substantially equal to the cross-sectional areas of the openings in the baffle next above whereby uniform cross-sectional flow is maintained from the baffle next above into the discharge opening.

5. A chamber of the class described having means to control a gravity flow of granular material, as claimed in claim 4, in which the guide means in the openings in the lower baffle divides the cross-sectional area of said openings into four substantially uniform areas.

6. A chamber of the class described having inlet means for the introduction of a granular material, a discharge opening at the lower part thereof to remove said granular material, and means to control the uniform gravity flow of granular material over the entire cross section of the chamber, said flow control means including a horizontal baffle having a number of uniformly spaced openings, and guide means in the discharge opening of said chamber dividing said discharge opening into individual areas substantially equal to the cross-sectional areas of each of the openings in the horizontal baffle whereby uniform cross-sectional flow is maintained from the baffle next above into the discharge opening.

7. A chamber of the class described having inlet means for the introduction of a granular material, discharge means at the lower part thereof to remove said granular material, and means to control the uniform gravity flow of granular material over the entire cross section of the chamber, said flow control means including a plurality of horizontal baffles, the upper of said baffles being provided with a number of uniformly spaced openings, said openings each being provided with a downwardly extending nozzle, the lower baffle having a lesser but proportional number of uniformly spaced openings of relatively greater cross section, guide means in the openings in the lower baffles dividing the cross-sectional area of said openings into substantially uniform areas approximately equal to the cross-sectional areas of each of the openings in the upper baffle from which the opening in the lower baffle receives granular material whereby the velocity of flow from each of the openings in the upper baffle is maintained substantially uniform, said guide means extending a sufficient distance above and below the lower baffle thereby providing independent flow paths for the granular materials flowing to each of the sections of said guide means, said openings on said lower baffles being each provided with downwardly extending nozzles, and the discharge means at the lower part of the chamber being provided with guide means dividing the area of a discharge opening into individual areas substantially equal to the cross-sectional areas of the openings in the baffle next above whereby uniform cross-sectional flow is maintained from the baffle next above into the discharge opening.

8. A chamber of the class described having inlet means for the introduction of a granular material, a discharge opening at the lower part thereof to remove said granular material, and means to control the uniform gravity flow of granular material over the entire cross section of the chamber, said flow control means including a horizontal baffle having a number of uniformly spaced openings and guide plate means dividing said discharge opening into individual areas substantially equal to and laterally aligned with the respective cross-sectional areas of the openings in the horizontal baffle, said guide plate means extending above said discharge opening and projecting thereinto.

WARD J. F. O'CONNOR.

REFERENCES CITED

The following references are of record in the file of this patent:

UNITED STATES PATENTS

| Number | Name | Date |
|---|---|---|
| 1,496,896 | Laffoon | June 10, 1924 |
| 2,085,132 | Underwood | June 29, 1937 |
| 2,125,245 | McCray | July 26, 1938 |